(12) United States Patent
Gelsey

(10) Patent No.: US 7,108,933 B2
(45) Date of Patent: Sep. 19, 2006

(54) THERMALLY EFFICIENT HYDROGEN STORAGE SYSTEM

(75) Inventor: Jon Gelsey, Lake Oswego, OR (US)

(73) Assignee: Intel Corporation, Santa Clara, CA (US)

( * ) Notice: Subject to any disclaimer, the term of this patent is extended or adjusted under 35 U.S.C. 154(b) by 103 days.

(21) Appl. No.: 10/086,904

(22) Filed: Feb. 28, 2002

(65) Prior Publication Data

US 2003/0162059 A1    Aug. 28, 2003

(51) Int. Cl.
H01M 8/18 (2006.01)
B01J 7/00 (2006.01)
C01B 3/02 (2006.01)

(52) U.S. Cl. .............................. 429/20; 429/17; 48/61; 422/198; 423/648.1

(58) Field of Classification Search ................... 429/17, 429/19, 20; 423/646, 657, 658.2, 648.1; 48/179, 199 R, 61, 116, 117; 422/109, 198, 422/211, 190
See application file for complete search history.

(56) References Cited

U.S. PATENT DOCUMENTS

| | | | |
|---|---|---|---|
| 3,607,066 A * | 9/1971 | Basch et al. ................ 423/579 |
| 4,000,003 A | 12/1976 | Baker et al. |
| 4,002,726 A | 1/1977 | Filby |
| 4,211,537 A | 7/1980 | Teitel |
| 4,302,217 A | 11/1981 | Teitel |
| 4,537,761 A | 8/1985 | Reed et al. |
| 4,570,446 A | 2/1986 | Matsubara et al. |
| 4,599,867 A | 7/1986 | Retallick |
| 4,628,010 A | 12/1986 | Iwanciow |
| 4,667,185 A | 5/1987 | Nourse et al. |
| 4,667,815 A | 5/1987 | Halene |
| 4,728,580 A | 3/1988 | Grasselli et al. |
| 5,360,461 A | 11/1994 | Meinzer |
| 5,372,617 A | 12/1994 | Kerrebrock et al. |
| 5,601,937 A | 2/1997 | Isenberg |
| 5,702,491 A * | 12/1997 | Long et al. ................ 48/197 R |
| 5,797,269 A | 8/1998 | Nishimura et al. |
| 5,928,805 A | 7/1999 | Singh et al. |
| 5,962,155 A | 10/1999 | Kuranaka et al. |
| 5,987,895 A | 11/1999 | Nishimura et al. |
| 6,074,447 A | 6/2000 | Jensen |
| 6,074,453 A | 6/2000 | Anderson et al. |
| 6,143,052 A | 11/2000 | Kiyokawa et al. |
| 6,165,643 A | 12/2000 | Doyle et al. |
| 6,194,092 B1 | 2/2001 | Ohara et al. |
| 6,258,401 B1 | 7/2001 | Crowley |
| 6,267,229 B1 | 7/2001 | Heung |
| 6,267,792 B1 | 7/2001 | Nagamiya et al. |
| 6,274,093 B1 | 8/2001 | Long et al. |
| 6,283,812 B1 | 9/2001 | Jin et al. |
| 6,297,592 B1 | 10/2001 | Goren et al. |
| 6,318,306 B1 | 11/2001 | Komatsu |

(Continued)

OTHER PUBLICATIONS

U.S. Appl. No. 60/311,459, filed Aug. 10, 2001, Kraus et al, "Fuel Processor Utilizing Heat Pipe Cooling".*

(Continued)

Primary Examiner—Raymond Alejandro
(74) Attorney, Agent, or Firm—Blakely, Sokoloff, Taylor & Zafman LLP

(57) ABSTRACT

Thermally efficient hydrogen storage systems are disclosed. An apparatus may include an exothermic hydrogen generator, and an endothermic hydrogen generator. In one aspect, the endothermic hydrogen generator may absorb heat from the exothermic hydrogen generator.

7 Claims, 2 Drawing Sheets

U.S. PATENT DOCUMENTS

| | | |
|---|---|---|
| 2001/0010873 A1 | 8/2001 | Thom |
| 2002/0071797 A1 | 6/2002 | Loffler et al. |
| 2003/0021741 A1 | 1/2003 | Childress et al. |
| 2003/0103880 A1 | 6/2003 | Bunk et al. |
| 2004/0154222 A1 | 8/2004 | Burch et al. |
| 2004/0209131 A1 | 10/2004 | Bolton et al. |
| 2004/0209137 A1* | 10/2004 | Corey et al. .................. 429/30 |
| 2005/0000160 A1 | 1/2005 | Childress et al. |

OTHER PUBLICATIONS

Dacosta, D. "*Advanced Thermal Hydrogen Compression,*" Proceedings of the 2000 DOE Hydrogen Program Review, NREL/CP-570-28890.

Dillon, et al. "*Carbon Nanotube Materials for Hydrogen Storage,*" Proceedings of the 2001 DOE Hydrogen Program Review, NREL/CP-570-30535.

* cited by examiner

_US 7,108,933 B2_

THERMALLY EFFICIENT HYDROGEN STORAGE SYSTEM

FIELD OF THE INVENTION

The disclosed methods and apparatus relate to the field of hydrogen storage systems. In particular, the methods and apparatus relate to hydrogen storage using both endothermic and exothermic hydrogen generators.

BACKGROUND OF THE INVENTION

Fuel cells that generate electrical power using reactions between hydrogen and an oxidizing gas such as oxygen or air are well known in the art. Such fuel cells require a source of hydrogen, such as a compressed hydrogen gas cylinder, a liquefied hydrogen tank, a hydrogen storage powder, a hydrogen storage alloy, a hydride such as lithium or sodium borohydride, a metal hydride or a reformed hydrocarbon such as natural gas or methane. The typical fuel cell has a single source of hydrogen, which may be produced by either exothermic or endothermic processes.

Depending on their efficiency, present fuel cells may generate more waste heat than usable electrical energy. For applications where fuel cells are used to power small, portable electronic devices such as cell phones, laptop computers, video cameras, flashlights, portable electrical tools, personal digital assistants, etc. the production of large amounts of waste heat can create problems with overheating of the electronic device or with excessively hot hand-held devices. As many electronic devices generate waste heat by their operation, the incorporation of a hydrogen fuel cell that produces additional waste heat creates serious problems with thermal control.

BRIEF DESCRIPTION OF THE DRAWINGS

The following drawings form part of the present specification and are included to further demonstrate certain embodiments of the invention. The embodiments may be better understood by reference to one or more of these drawings in combination with the detailed description of specific embodiments of the invention presented herein.

DESCRIPTION OF ILLUSTRATIVE EMBODIMENTS

Definitions

Figure 1:
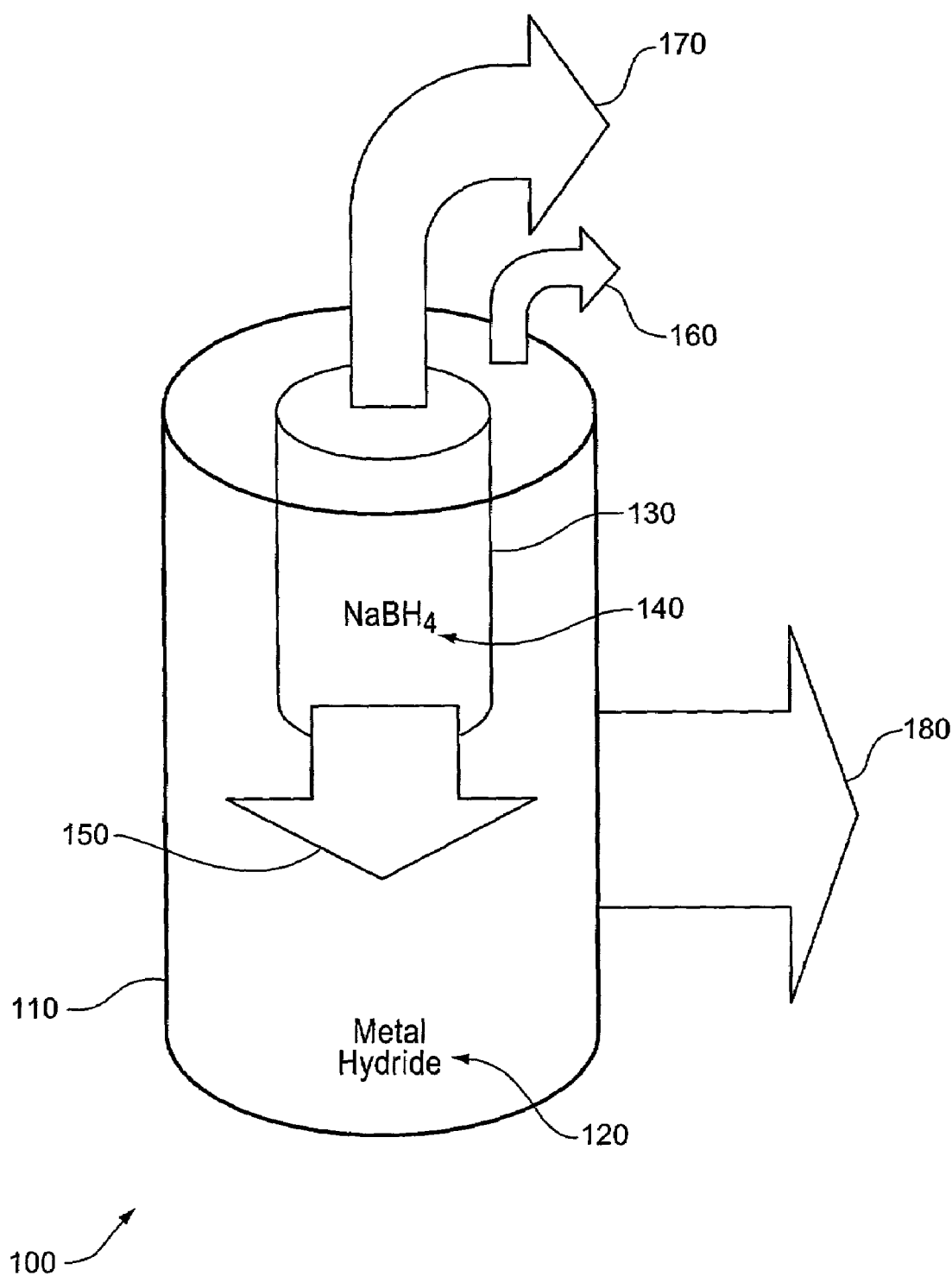
FIG. 1 illustrates an exemplary apparatus (not to scale) comprising exothermic and endothermic hydrogen generators.

As used herein, "a" or "an" may mean one or more than one of an item.

The terms "exothermic" and "endothermic" are used according to their plain and ordinary meanings. Generally, an "exothermic" process or reaction is one that releases heat to its environment, while an "endothermic" process or reaction is one that absorbs heat from its environment. Within the context of the present disclosure, an exothermic hydrogen generator will transfer heat to an endothermic hydrogen generator, while an endothermic hydrogen generator will absorb heat from an exothermic hydrogen generator during hydrogen generation. In certain embodiments of the invention, an endothermic hydrogen generator may also absorb heat from other sources, such as a fuel cell.

As used herein, the term "about" when applied to a number means within plus or minus five percent of that number. For example, "about 100" means any number between 95 and 105.

As used herein, the term "approximately" means within ten percent of a value. For example, "approximately equal" would mean that a first value is within plus or minus ten percent of a second value.

As used herein, an "electronic device" comprises any device and/or apparatus that may derive part or all of its power supply from a hydrogen based fuel cell. A "portable electronic device" is one that may be moved from one location to another by a person. In some embodiments of the invention, a "portable electronic device" may be carried by a person. In certain embodiments of the invention, a "portable electronic device" may be a hand-held device. "Portable electronic devices" include, but are not limited to, cell phones, laptop computers, video cameras, flashlights, portable electrical tools and personal digital assistants.

As used herein, two or more components are "operably coupled" when there are one or more connections between the components that allow or facilitate their functional interaction. For example, a hydrogen generator would be "operably coupled" to a fuel cell when there is a functional attachment that allows hydrogen from the hydrogen generator to be used by the fuel cell to generate electrical power. Similarly, a fuel cell would be "operably coupled" to an electronic device when there is a functional attachment that allows electrical power generated by the fuel cell to be used to power the electronic device.

Fuel Cells

Certain embodiments of the invention concern fuel cells comprising both endothermic and exothermic hydrogen generators. The principles underlying hydrogen based fuel cells have been known since the experiments of William Grove in 1839. A variety of hydrogen utilizing fuel cell designs are known in the art, including but not limited to the polymer electrolyte membrane (PEM) fuel cell, the phosphoric acid fuel cell, the molten carbonate fuel cell and the solid oxide fuel cell. The methods and apparatus disclosed herein are not limited as to the type of fuel cell, so long as the fuel cell utilizes hydrogen. Different fuel cells are designed to function at different operating temperatures. In some embodiments of the invention, fuel cells designed to operate at near ambient temperatures, such as PEM fuel cells, may be used in the disclosed methods and apparatus.

The electrochemical reactions underlying hydrogen fuel cells are known. Once hydrogen is produced, it is provided to the anode side of the fuel cell, where it encounters a catalyst, such as platinum. The catalyst facilitates the removal of electrons from hydrogen, creating $H^+$ ions. The electrons travel through an external circuit to the cathode side of the fuel cell, providing electrical power. At the cathode, $H^+$, electrons and oxygen react to create water. Waste heat is also produced as a byproduct of the electrochemical processes.

Variations on this basic scheme are well known. The charge carrier species in PEM fuel cells and phosphoric acid fuel cells is $H^+$, which diffuses from the anode to the cathode through an electrolyte. Carbonate fuel cells involve an intermediary process, in which oxygen reacts with electrons and carbon dioxide at the cathode to produce $CO_3^{-2}$. The $CO_3^{-2}$ passes through an electrolyte to the anode, where it reacts with hydrogen to form water and carbon dioxide, releasing two electrons. In solid oxide fuel cells, another intermediary process results in the cathodic formation of $O^{-2}$, which reacts with hydrogen at the anode to form water and release electrons. These and any other known type of hydrogen utilizing fuel cells are all contemplated for use in the methods and apparatus disclosed herein.

The voltage difference generated by a single fuel cell is limited to about 1.2 volts per electrode pair (anode plus cathode). It is contemplated that the apparatus and methods disclosed herein may utilize single fuel cells or multiple fuel cells that are connected in series to provide any level of voltage required to operate an associated electronic device.

Hydrogen Generators

Various embodiments of the invention comprise both exothermic and endothermic hydrogen generators. The claimed methods and apparatus are not limiting as to the particular exothermic or endothermic hydrogen generators used. Rather, it is contemplated that any exothermic hydrogen generator known in the art could be used with any known endothermic hydrogen generator.

Exothermic Hydrogen Generators

A variety of exothermic hydrogen generators are known. These include but are not limited to borohydride (e.g., sodium borohydride or lithium borohydride) solutions exposed to a catalyst such as platinum, solid hydrides exposed to water at elevated temperature, hydrogen generators that utilize partial oxidation (POX) reformation of natural gas, methane or other hydrocarbons, and other catalytic hydrogen generators.

Exothermic hydrogen generators comprising a borohydride, such as lithium or sodium borohydride, are known in the art (see, e.g., U.S. Pat. Nos. 4,000,003; 4,002,726; 4,628,010; 5,372,617). Borohydride based hydrogen generators may be obtained from commercial sources, such as Millenium Cell, Inc. (Eatontown, N.J.). In the presence of an appropriate catalyst, such as platinum, aqueous borohydride solutions react with water to generate hydrogen and borate. The borate can be recycled to regenerate borohydride (U.S. Pat. No. 4,002,726). In various embodiments of the invention, the catalyst may be in the form of a solid metal object, a perforated metal object, a metal coated object, a metal mesh, a metal sponge, metal wires or metal coated wires, an aggregate of metal particles or metal coated particles, or any other form known in the art.

In certain embodiments of the invention, production of hydrogen through exothermic reaction of borohydrides may be controlled by regulating exposure of the catalyst to the borohydride solution. For example, a bimetallic, temperature-sensitive control mechanism could reversibly place a non-catalytic metal (or non-metal) sheath between the platinum and the borohydride solution to regulate the generation of heat by the exothermic process. In alternative embodiments of the invention, the control mechanism could be regulated to limit the rate of exothermic hydrogen production to the fuel cell by the demand for electrical power of an attached electronic device. Such control mechanisms and other features of borohydride based hydrogen generators are known in the art. It is contemplated that any such known apparatus and methods may be used in the practice of the claimed subject matter.

An alternative embodiment of a borohydride based hydrogen generator is disclosed in U.S. Pat. No. 4,628,010, which shows hydrogen generation by reaction of lithium borohydride with iron oxide. In other alternative embodiments of the invention, solid chemical hydrides such as lithium borohydride, sodium borohydride, calcium hydride, lithium aluminum hydride or lithium hydride generate hydrogen upon exposure to water (U.S. Pat. Nos. 4,000,003; 5,372,617; 5,702,491). In certain embodiments of the invention, hydrogen generation proceeds more efficiently at elevated temperature (U.S. Pat. No. 5,372,617).

Another exemplary exothermic hydrogen generator is disclosed in U.S. Pat. No. 6,274,093, comprising a compound such as ammonia that can react with a solid compound, such as lithium aluminum tetrahydride, to release hydrogen. The rate of the reaction (and the corresponding rate of hydrogen production) can be controlled by regulating the flow of ammonia to a reactor containing the tetrahydride.

Hydrogen generators based on reformation of hydrocarbons are well known (e.g., U.S. Pat. Nos. 5,601,937; 5,928,805; 6,267,792; 6,318,306). Hydrogen generation by reformation of hydrocarbons, such as natural gas, can be either exothermic or endothermic, depending on the process used. Steam reformation of hydrocarbons with water vapor results in endothermic hydrogen generation, while partial oxidation (POX) reformation with a burner or catalyst results in exothermic hydrogen generation. An exemplary exothermic hydrogen generator would comprise POX reformation of hydrocarbons.

Certain hydrogen generators based on hydrocarbon reformation are designed to operate at very high temperatures. For example, the endothermic hydrogen generator disclosed in U.S. Pat. No. 5,601,937 operates at a temperature of between 600 and 800° C. The skilled artisan will realize that such high temperature hydrogen generators are generally not suitable for use with portable electronic devices.

Endothermic Hydrogen Generators

A variety of endothermic hydrogen generators are known, any of which may be used in the methods and apparatus disclosed herein. In certain embodiments of the invention, endothermic hydrogen generators utilize metal hydrides that can reversibly adsorb or release hydrogen gas. Hydrogen uptake by such metal hydrides is an exothermic process. Hydrogen release is endothermic and can be activated by heating the metal hydride, decreasing the external pressure or irradiating the metal hydride with a laser.

Metal hydride based hydrogen generators are one of the most commonly used hydrogen generation systems (e.g., U.S. Pat. Nos. 4,211,537; 4,728,580; 4,667,185; 6,165,643). Endothermic hydrogen generation using metal hydride or metal alloy hydrides is well known (U.S. Pat. Nos. 4,302,217; 4,537,761; 4,570,446; 4,599,867; 5,360,461; 5,797,269; 5,962,155; 5,987,895; 6,143,052; 6,194,092; 6,267,229). Any such hydride based endothermic hydrogen generator may be used in the methods and apparatus disclosed herein.

In another exemplary embodiment of the invention, an endothermic hydrogen generator comprises carbon nanotube hydrogen storage systems (e.g., Dillon et al., "Carbon Nanotube Materials for Hydrogen Storage," Proceedings of the 2001 DOE Hydrogen Program Review, http://www.eren.doe.gov/hydrogen/pdfs/30535am.pdf). In this system, single-walled carbon nanotubes can reportedly store up to 7 weight percent of hydrogen gas. It is suggested that semiconducting carbon nanotubes are capable of storing more hydrogen than metallic nanotubes. Methods for preparing carbon nanotubes are well known (e.g., U.S. Pat. Nos. 6,258,401; 6,283,812; 6,297,592). Carbon nanotubes may also be obtained from commercial sources, such as Carbo-Lex (Lexington, Ky.), NanoLab (Watertown, Mass.), Materials and Electrochemical Research (Tucson, Ariz.) or Carbon Nano Technologies Inc. (Houston, Tex.). Methods of adsorption and desorption of hydrogen from carbon nanotubes, suitable for use in the presently disclosed methods and apparatus, are disclosed in Dillon et al. (2001).

In alternative embodiments of the invention, endothermic hydrogen generators may comprise tanks containing compressed hydrogen gas or liquid hydrogen. Expansion of compressed gas or conversion of liquid hydrogen to gaseous hydrogen are endothermic processes that may be used in the disclosed methods and apparatus. In another alternative embodiment of the invention, an endothermic hydrogen generator is disclosed in U.S. Pat. No. 5,601,937, discussed above in connection with hydrocarbon reformation. Catalytic decomposition of methanol into hydrogen and carbon monoxide is also an endothermic process Control Mechanisms In certain embodiments of the invention, the rate of exothermic and/or endothermic hydrogen generation may be regulated by various control mechanisms. A variety of mechanisms for regulating hydrogen generators are known (e.g., U.S. Pat. Nos. 4,211,537; 4,302,217; 5,372,617; 5,702, 491; 5,797,269; 5,987,895; 6,267,792). Any known control mechanism for regulating hydrogen generation may be used in the disclosed methods and apparatus.

Such control mechanisms may be either active or passive in nature. For example, a requirement for electrical power, such as turning on an electrical device powered by a fuel cell, could serve as a signal to initiate exposure of a platinum catalyst to an aqueous borohydride solution, initiating exothermic hydrogen production. The amount of hydrogen and electrical power generated will be directly correclated to the surface area of the catalyst exposed to the borohydride solution. Heat released by the exothermic process could be passively transferred to an endothermic hydrogen generator, such as a metal hydride. In some embodiments of the invention, heat transfer may be facilitated by incorporation of heat transfer mechanisms, such as radiative fins, liquid filled tubes or a heat conductive material such as aluminum or copper. Absorption of heat by a metal hydride would initiate endothermic hydrogen production. In certain embodiments of the invention, the rate of endothermic hydrogen production may be passively controlled by the rate of heat generation from exothermic hydrogen production. In some alternative embodiments of the invention, an external heat source, such as a resistive electrical heater, may be used. In other alternative embodiments of the invention, waste heat generated by a fuel cell, such as a PEM fuel cell, could be transferred to an endothermic hydrogen generator to provide an additional source of heat.

In certain embodiments of the invention, the electrical power generated by a hydrogen fuel cell may be supplemented by an additional battery. This additional source of electrical power could be used, for example, to assist in the initiation of hydrogen production, such as by powering a heater to facilitate endothermic hydrogen production, by opening or closing valves or covers to regulate exposure of a borohydride solution to a catalyst or to regulate the amount of water or water vapor added to a chemical hydride.

In some embodiments of the invention, the control mechanism for regulating the amount of catalyst exposed to borohydride solution may receive input from one or more temperature sensors, such as a thermistor, that monitors the temperature of the exothermic hydrogen generator, the endothermic hydrogen generator or the fuel cell compartment. The control mechanism may incorporate a microprocessor, microcontroller or other control mechanism that prevents the temperature from exceeding predetermined limits.

In other embodiments of the invention, a more active mechanism of regulating hydrogen generation may be used. Such a mechanism, for example, could control the rates of both exothermic and endothermic hydrogen production to more precisely control the overall temperature of the hydrogen storage system, fuel cell or electronic device. In certain embodiments of the invention, the rates of endothermic and exothermic hydrogen generation may be balanced to provide an overall thermally neutral hydrogen generation, or even a net endothermic hydrogen generation. In other embodiments of the invention, a microcontroller or other control mechanism could regulate the rates of endothermic and/or exothermic hydrogen generation to maintain a selected temperature of the hydrogen storage system, fuel cell and/or electronic device. Alternatively, the temperature of the hydrogen storage system could be controlled to correspond to the ambient temperature of the environment.

In various embodiments of the invention, any accessory mechanisms, devices or components appropriate for control of the hydrogen generators, including without limitation valves, pumps, covers, relief valves, sensors, thermistors, microcontrollers, controllers, microprocessors, displays, readouts, manifolds, etc. may be used in the disclosed methods and apparatus.

Accordingly, methods and apparatus comprising both exothermic and endothermic hydrogen generators are disclosed. In certain embodiments of the invention, such hydrogen generators may be used to provide hydrogen fuel to a fuel cell. The use of both exothermic and endothermic hydrogen generators is advantageous for providing thermally efficient hydrogen storage systems that reduce or eliminate the formation of waste heat resulting from hydrogen generation. In some embodiments of the invention, the exothermic hydrogen generator comprises a sodium borohydride hydrogen generator and the endothermic hydrogen generator comprises a metal hydride storage system. In various embodiments of the invention, the rates of exothermic and/or endothermic hydrogen generation may be controlled. Control of exothermic and/or endothermic hydrogen generation may provide endothermic or thermally neutral hydrogen production. In certain embodiments of the invention, the thermally efficient hydrogen storage system may be used to provide electrical power to a portable electronic device.

EXAMPLES

The following examples are included to demonstrate preferred embodiments of the invention. It should be appreciated by those of skill in the art that the techniques disclosed in the examples which follow represent techniques discovered to function well in the practice of the disclosed embodiments of the invention. However, those of skill in the art should, in light of the present disclosure, appreciate that many changes can be made in the specific embodiments of the invention which are disclosed and still obtain a like or similar result within the scope of the claimed subject matter.

Example 1

Thermally Efficient Hydrogen Storage System

FIG. 1 discloses an exemplary embodiment of the invention comprising a thermally efficient hydrogen storage system 100. The system 100 comprises a first compartment 110 containing a first hydrogen generator 120. Inside the first compartment 110 is a second compartment 130 containing a second hydrogen generator 140. Both the first and second compartments (110, 130) are connected through ports (160, 170) to an external device, such as a fuel cell. The ports (160, 170) allow for the passage of hydrogen gas from the hydrogen generators (120, 140) to the external device.

In various embodiments of the invention, the ports (160, 170) may incorporate filters. In exemplary embodiments of the invention, porous metal filters or porous polytetrafluoroethylene films may be used. However, any filter that allows the free passage of hydrogen gas, while preventing movement of the components of the hydrogen generators (120, 140), may be used.

In certain embodiments of the invention, the movement of hydrogen may be regulated by various valves, pumps or other control mechanisms, as disclosed above. In other embodiments of the invention, the rates of hydrogen generation by the first (120) and/or second (140) hydrogen generators may also be regulated by various control mechanisms, as disclosed above.

In certain embodiments of the invention, the hydrogen generators (120, 140) may be reversible. That is, depending on the hydrogen generators (120, 140) used, it may be possible to recharge the hydrogen storage system 100 with hydrogen after the system 100 has been discharged. In this case, the ports (160, 170) may serve, as hydrogen recharge ports, allowing uptake of hydrogen into the first and second compartments (110, 130).

In the exemplary embodiment shown in FIG. 1, the first compartment 110 contains an endothermic hydrogen generator 120, comprising a metal hydride that has been charged with hydrogen gas. In this embodiment, the second compartment 130 contains an exothermic hydrogen generator 140, comprising an aqueous solution of sodium borohydride and a catalyst, for example, platinum. As a result of exothermic hydrogen generation in the second compartment 130, heat is produced and is transferred to the first compartment 110. This transfer of heat 150 results in the release of hydrogen from the metal hydride 120, which requires input of heat in order to produce hydrogen. Since the heat produced by the exothermic hydrogen generator 140 is largely absorbed by the operation of the endothermic hydrogen generator 120, the net release of heat 180 by the hydrogen storage system 100 is low. In some embodiments of the invention, the rates of exothermic and/or endothermic hydrogen production may be controlled so that the hydrogen storage system 100 is thermally neutral. In this case, heat released 150 by the exothermic hydrogen generator 140 is balanced by heat absorbed by the endothermic hydrogen generator 120. In certain embodiments of the invention, the first compartment 110 may be enclosed by a container composed of materials of low thermal conductivity to increase the efficiency of heat absorption by the endothermic hydrogen generator 120. Such materials are well known in the art.

In some embodiments of the invention, the efficiency of heat transfer between the first 110 and second 130 compartments may be increased by using any known method of heat transfer. For example, the container enclosing the inner, second compartment 130 may be comprised in whole or in part of a substance with a relatively high heat conductance, such as copper or aluminum. Heat transfer may be increased by the addition of metal fins extending into the first 110 and/or second compartment 130. In other exemplary embodiments of the invention, tubes filled with a heat conducting liquid may extend through the first 110 and/or second compartment 130. The tubes may or may not have fins or other projections attached to increase the efficiency of heat transfer. Various methods and designs to increase heat transfer in hydrogen generators are known (see, e.g., U.S. Pat. Nos. 4,211,537; 4,302,217; 4,570,446; 4,599,867; 5,962,155; 6,194,092; 6,267,229), any of which may be used in the methods and apparatus disclosed herein.

Example 2

Figure 2:
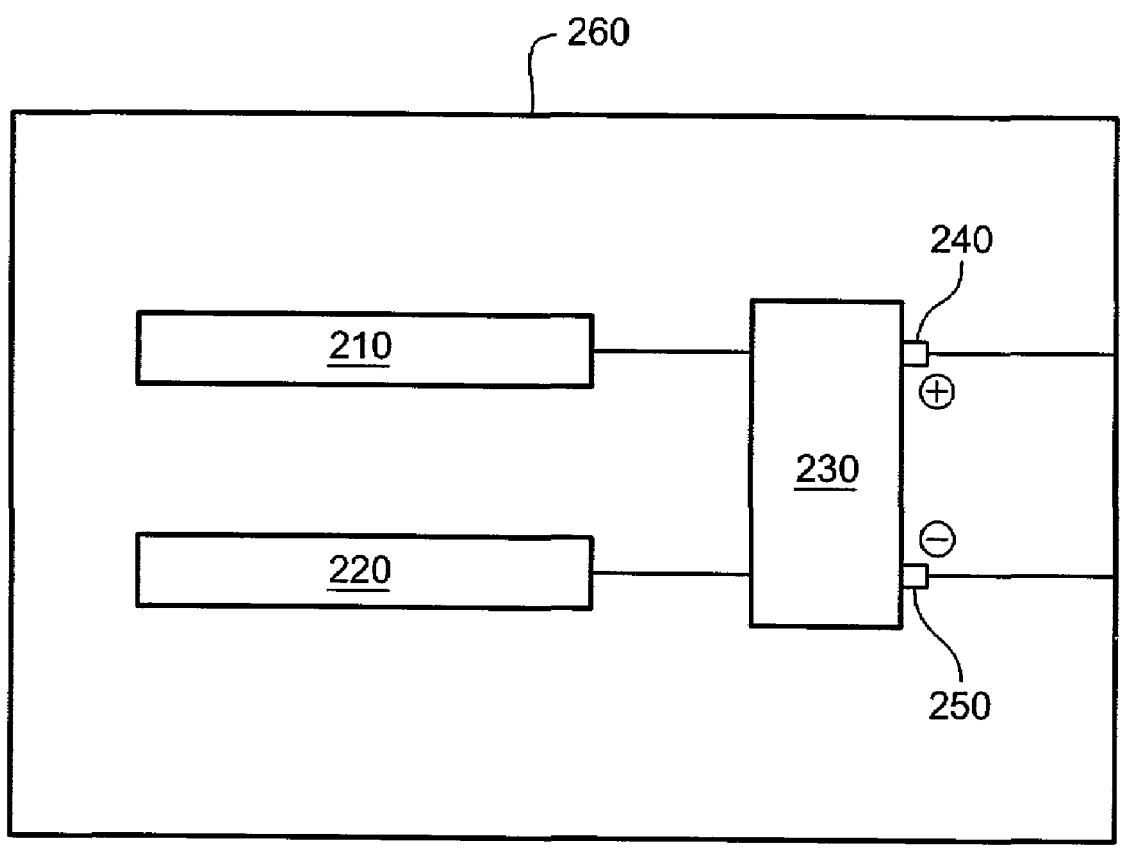
FIG. 2 illustrates another exemplary apparatus (not to scale) comprising exothermic and endothermic hydrogen generators, a fuel cell and a portable electronic device.

Portable Electronic Device Comprising Exothermic and Endothermic Hydrogen Generators FIG. 2 illustrates another exemplary embodiment of the invention. A portable electronic device 260 comprises at least one exothermic hydrogen generator 210 and at least one endothermic hydrogen generator 220. The exothermic 210 and endothermic 220 hydrogen generators are operably coupled to a fuel cell 230, to provide hydrogen to the fuel cell 230. The fuel cell 230, may be any fuel cell 230 known in the art that utilizes hydrogen to produce electrical power. Certain embodiments of the invention comprise a fuel cell 230 designed to operate at near ambient temperature. The fuel cell 230 comprises positive 240 and negative 250 terminals. The fuel cell 230 is operably coupled to the portable electronic device 260 to provide electrical power to the portable electronic device 260.

All of the METHODS and APPARATUS disclosed and claimed herein can be made and executed without undue experimentation in light of the present disclosure. It will be apparent to those of skill in the art that variations may be applied to the METHODS and APPARATUS and in the elements or in the sequence of elements of the methods described herein within the scope of the claimed subject matter. More specifically, it will be apparent that certain agents that are both chemically and physiologically related may be substituted for the agents described herein while the same or similar results would be achieved. All such similar substitutes and modifications apparent to those skilled in the art are deemed to be within the spirit, scope and concept of the claimed subject matter.

What is claimed is:

1. An apparatus comprising:
   a first compartment including an endothermic hydrogen generator to generate hydrogen;
   a second compartment including an exothermic hydrogen generator to generate hydrogen, wherein the second compartment is to transfer heat to the first compartment,
   wherein the second compartment is inside the first compartment, and
   wherein at least one of the endothermic hydrogen generator and the exothermic hydrogen generator comprises a solid including hydrogen;
   a substance having a low thermal conductivity enclosing the first compartment;
   a substance having a high heat conductance enclosing the second compartment;
   a fuel cell to generate electrical power by using the hydrogen;
   a first port connected to the first compartment and to the fuel cell; and
   a second port connected to the second compartment and to the fuel cell.

2. The apparatus of claim 1, further comprising a conductive fin extending into either the first compartment, the second compartment, or both the first and the second compartments.

3. The apparatus of claim 1, further comprising a tube to include a heat conducting liquid extending through the first compartment, the second compartment, or both the first and the second compartments.

4. The apparatus of claim 1, wherein the exothermic hydrogen generator comprises an exothermic hydrogen generator that is selected from the group consisting of a borohydride solution exposed to a catalyst, a solid lithium aluminum tetrahydride, a hydride exposed to water, a partial oxidation hydrocarbon reformer, and combinations thereof.

5. The apparatus of claim 1, wherein the endothermic hydrogen generator comprises an endothermic hydrogen generator that is selected from the group consisting of one or more metal hydrides, one or more metal alloy hydrides, a carbon nanotube system, a compressed hydrogen gas, a liquid hydrogen, a steam hydrocarbon reformer, and combinations thereof.

6. The apparatus of claim 1, wherein heat released by the exothermic hydrogen generator is approximately balanced by heat absorbed by the endothermic hydrogen generator.

7. The apparatus of claim 1, further comprising an electrical heater to heat the endothermic hydrogen generator.

\* \* \* \* \*